Sept. 6, 1955

G. L. McCARGAR 2,717,143

WEIGHING AND PACKAGING MACHINE

Filed Dec. 13, 1952

5 Sheets-Sheet 1

Inventor
George L. McCargar
By Harold O. VanAntwerp
Attorney.

Sept. 6, 1955  G. L. McCARGAR  2,717,143
WEIGHING AND PACKAGING MACHINE
Filed Dec. 13, 1952  5 Sheets-Sheet 3

Inventor
George L. McCargar
By Harold O. VanAntwerp
Attorney

Sept. 6, 1955                G. L. McCARGAR                2,717,143
                      WEIGHING AND PACKAGING MACHINE
Filed Dec. 13, 1952                                    5 Sheets-Sheet 4

Inventor
George L. McCargar
By Harold O. Van Antwerp
Attorney

Sept. 6, 1955  G. L. McCARGAR  2,717,143
WEIGHING AND PACKAGING MACHINE
Filed Dec. 13, 1952  5 Sheets-Sheet 5

Inventor
George L. McCargar
By Harold O. Van Antwerp
Attorney

2,717,143

WEIGHING AND PACKAGING MACHINE

George L. McCargar, Chicago, Ill.

Application December 13, 1952, Serial No. 325,871

5 Claims. (Cl. 249—19)

This invention relates to a weighing and packaging machine particularly intended to operate upon fresh vegetables of light fluffy nature, such as sliced cabbage, spinach, or the like, but it is capable of handling other materials as well. This invention in some ways resembles the machine shown in my Patent No. 2,597,120, issued May 20, 1952, but is an improvement over that machine in that it is more simple in construction and more accurate in operation.

The purpose of this machine is to rapidly and consecutively weigh predetermined amounts of the material which is loose and fluffy, drop the weighed material into a compressor where it is compressed into a compact mass which is then deposited into a bag for handling and display. It is important that each amount of the material be accurately weighed to keep within the legal tolerances allowed for public sale. It is also important that the machine operate rapidly for economic reasons so that large quantities may be packaged within a relatively short time.

Figure 1:
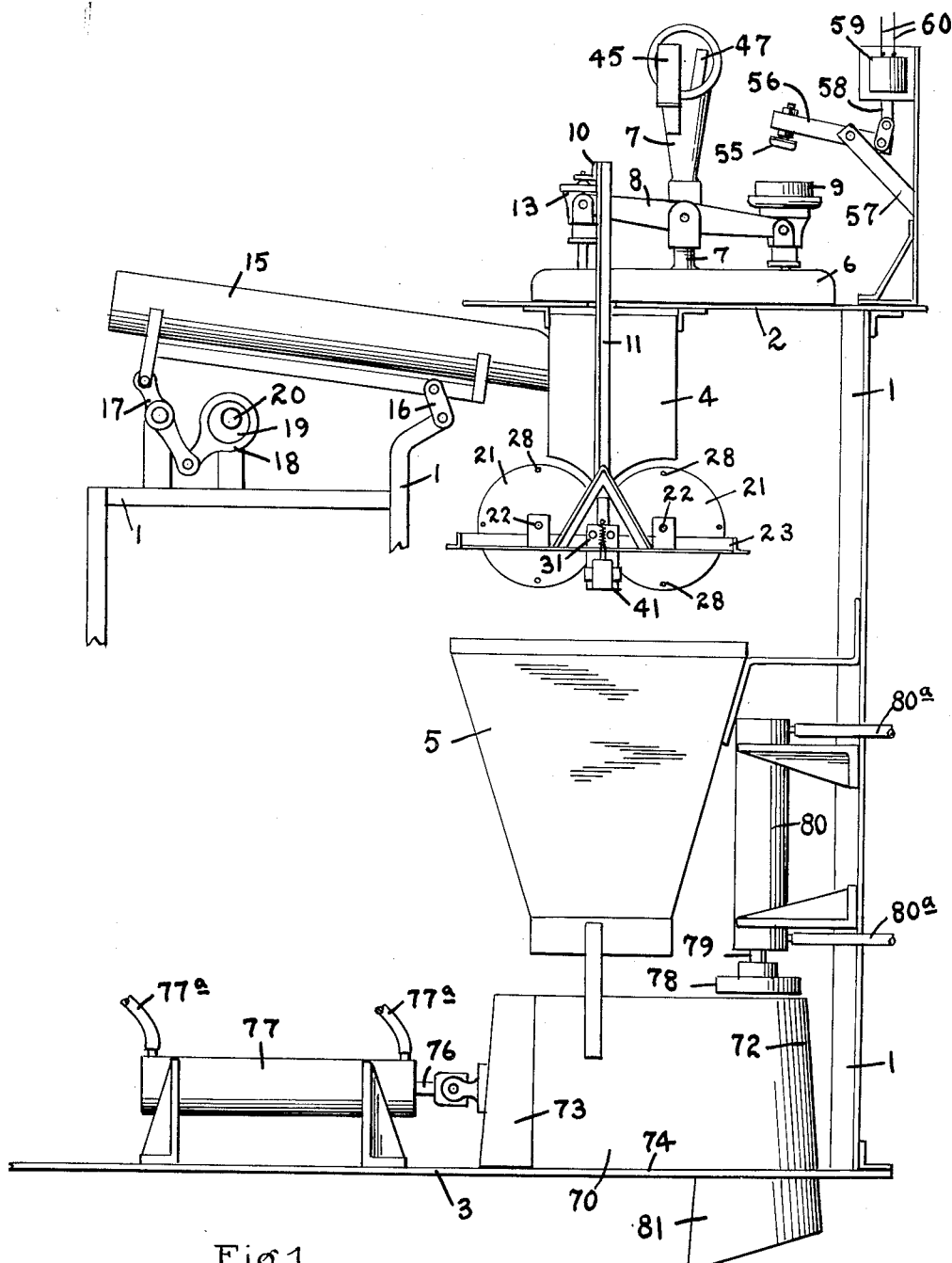
Figure 2:
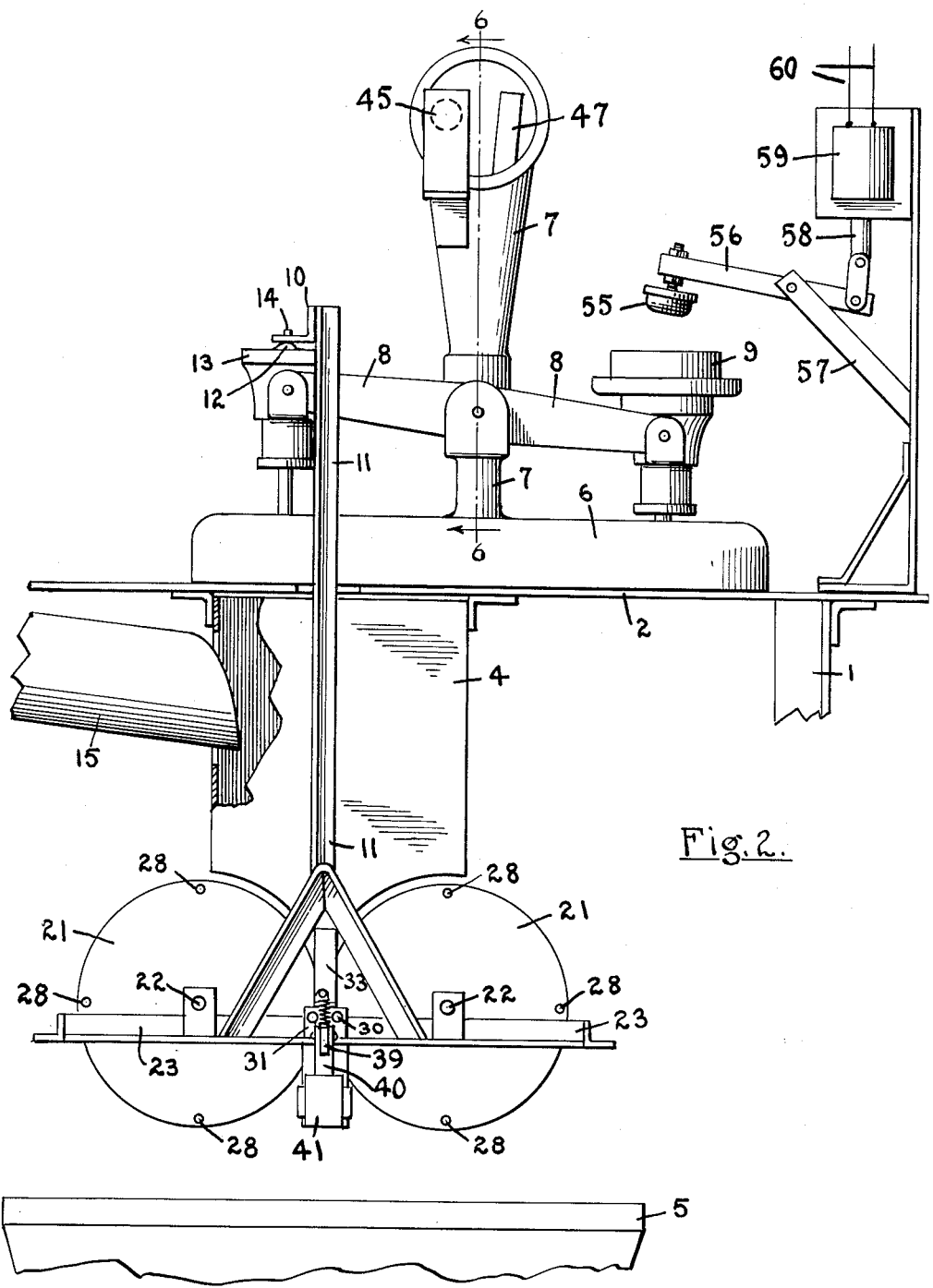
Figures 3, 4:
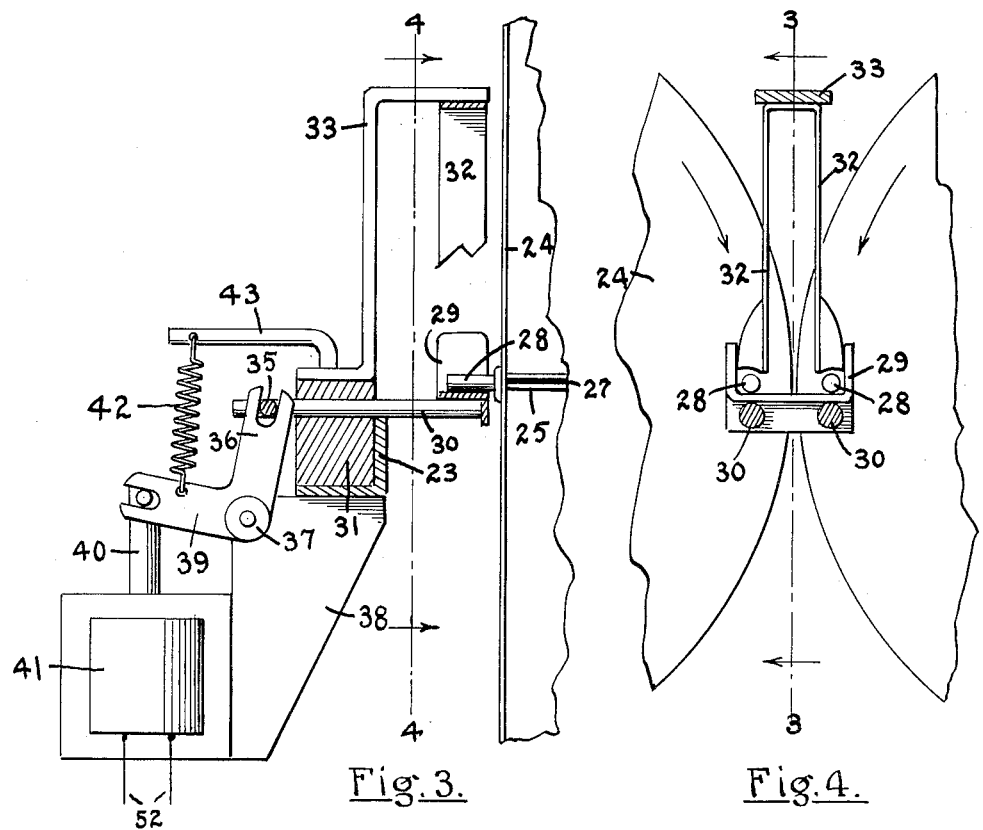
Figure 5:
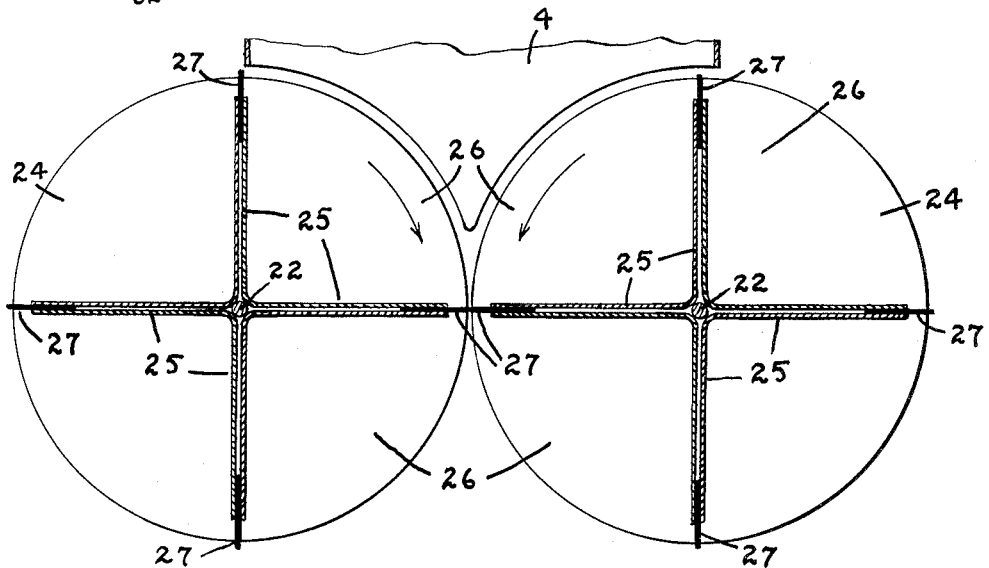
Figure 6:
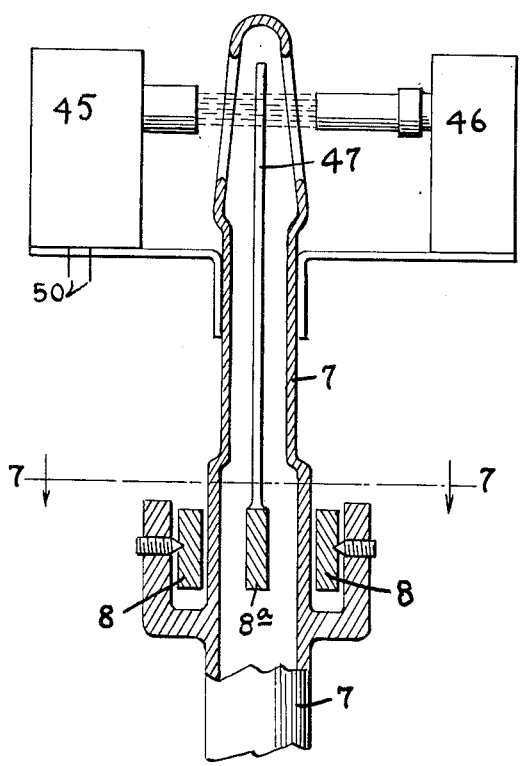
Figure 7:
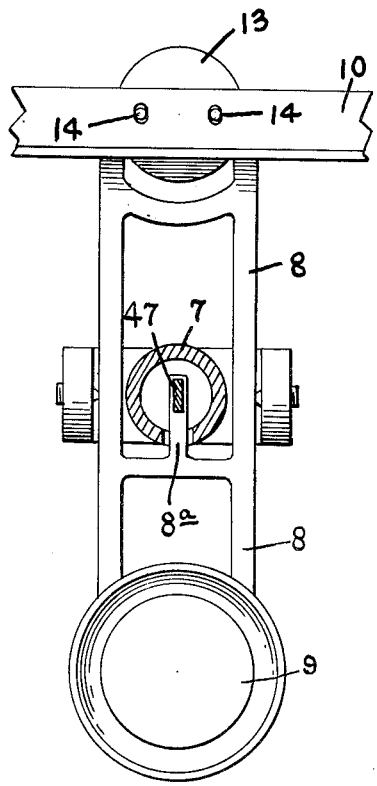
Figure 8:
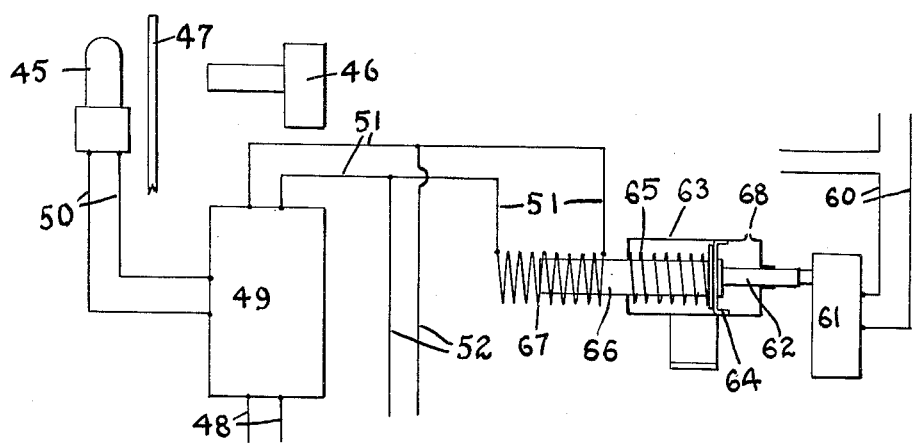
Figure 9:
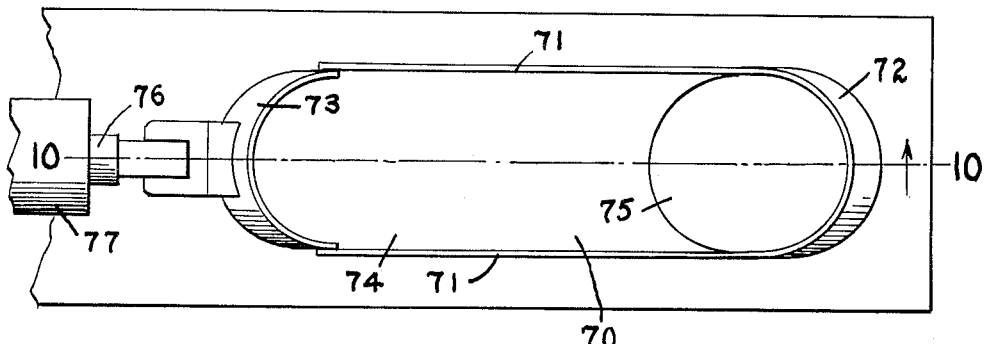
Figure 10:
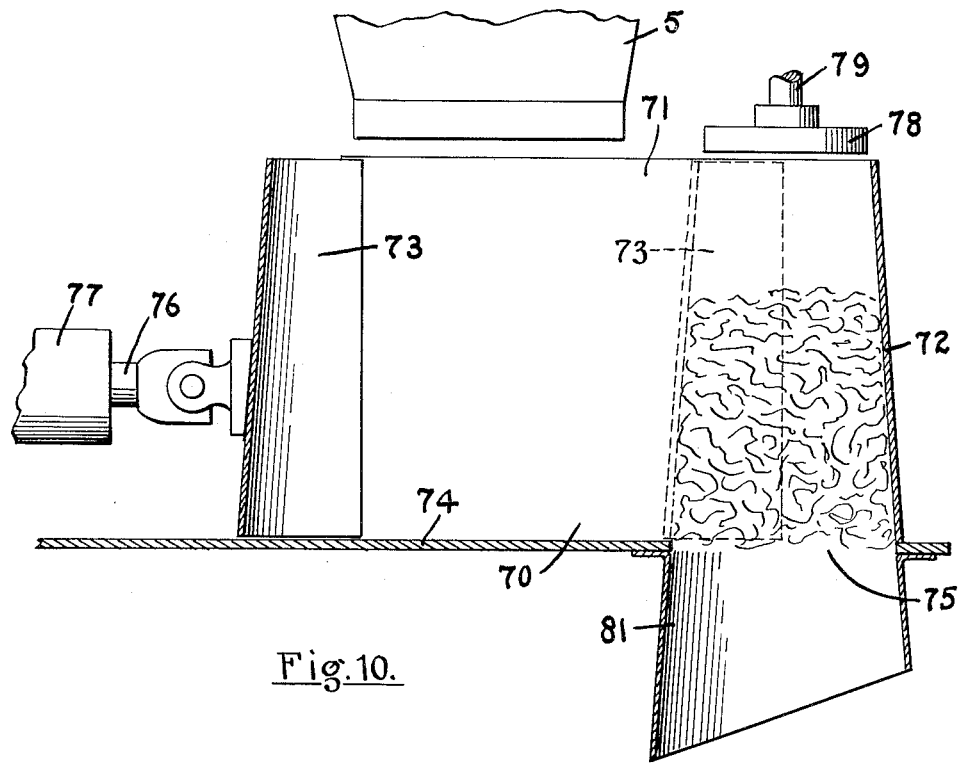

The invention is hereafter more fully described and particularly defined by the appended claims, reference being had to the accompanying drawings in which, Fig. 1 is an elevation of the essential parts of the machine, Fig. 2 is an enlarged elevation of the weighing portion of the machine, Fig. 3 is an enlarged sectional elevation of the tripping device on the line 3—3 of Fig. 4, Fig. 4 is a sectional elevation of the weighing wheel holding mechanism on the line 4—4 of Fig. 3, Fig. 5 is a sectional elevation of the weighing wheels, Fig. 6 is an enlarged sectional elevation of the scale beam support and electric control mechanism on the line 6—6 of Fig. 2, Fig. 7 is a sectional plan view of the scale beam and support on the line 7—7 of Fig. 6, Fig. 8 is a diagram illustrating the electrical circuits and control mechanism, Fig. 9 is a plan view of the compressing mechanism, and Fig. 10 is a sectional elevation of the compressing mechanism on the line 10—10 of Fig. 9.

Like reference numerals apply to like parts in all of the figures.

The machine is provided with a suitable supporting frame generally designated as 1, on which there is an upper shelf 2 and a lower shelf 3. An upper hopper 4 is suspended from the upper shelf 2 and a lower hopper 5 supported on the frame between the two shelves.

A weighing scale is located upon the upper shelf 2. This scale is of conventional form excepting that it has been somewhat modified for the present purpose and has a base 6, a central pedestal 7 and a beam 8 which is pivoted at its center on the pedestal 7. At one end of the beam 8 a weight 9 is supported and the other end of the beam carries a bracket comprising the cross member 10 and the vertical legs 11 which, at their lower ends, support the weighing wheels and locking and tripping mechanism hereafter described.

So that the bracket may have free balance movement, its cross member 10 is supported on a hump 12 on the beam-supported member 13 and pins 14 extend through holes in the cross member to retain it in position, the pins 14 having loose fit in the holes so that a limited swinging movement of the bracket is permitted.

The hopper 4 is open at its lower end and the material is fed into it through an opening in its side by a chute 15 which is preferably mounted for rapid vibration or reciprocation. For this purpose the chute 15 is mounted on the frame 1 on pivoted links 16 and 17, the link 17 being connected with a collar 18 surrounding an eccentric disk 19 fixed to a shaft 20 which is rotated by suitable means.

Below the open end of the hopper 4 the two weighing wheels 21 are mounted, each having a shaft 22 journaled on a frame 23 which surrounds the wheels and is fixed to the lower ends of the vertical legs 11 of the bracket, which is hung at one end of the scale beam 8.

Each of the weighing wheels 21 has two spaced circular end plates 24, the corresponding end plates of the two wheels being mounted closely adjacent each other but each wheel turns independently on its own shaft 22. Between the end plates 24 of each wheel a plurality of radial partitions 25 extend, four being shown, and these partitions extend from the center outwardly to the periphery, dividing each wheel into a plurality of outwardly opening compartments. The outer edges of the partitions 25 are preferably provided with strips of flexible material 27 such as rubber, which may extend slightly outwardly beyond the periphery of the wheel.

The outer surface of one of the end plates 24 of each wheel has a plurality, corresponding in number with the partitions 25, of pins 28 which are received in a latching stirrup 29, which is carried on a slide composed of two rods 30 which extend through a block 31 fastened to the frame 23. The pins, one in each wheel, enter the stirrup 29 from above and are held in place by spring latches 32 which depend from a bracket 33 rigidly mounted on the block 31. These pins 28 are so located with respect to the partitions 25 that when latched within the stirrup they hold the two wheels 21 with compartments adjacent and registering with each other and with the lower partitions thereof in substantially horizontal plane. When so located, these adjoining compartments form a receptacle directly beneath the hopper into which the material to be weighed falls by gravity.

The weight 9 at one end of the scale beam 8 is sufficient to counterbalance the weight of the bracket 11 hung from its opposite end and the weighing wheels 21 and other mechanism mounted on the bracket plus the weight of the portion of material to be weighed. Thus when material of the desired weight has been deposited in the adjoining compartments 26 of the wheels, the scale beam will tilt to lower that end which carries the bracket and wheels, which will cause release of the pins 28 and permit the wheels to turn to dump their load into the hopper 5 as hereafter explained.

The slide having the two rods 30 slidably mounted in the block 31, has a cross member 35 connected to one arm 36 of a bell crank 37, the bell crank being pivoted on a supporting bracket 38 attached to the frame 23. The other arm 39 of the bell crank is connected to the plunger 40 of a solenoid magnet 41 also mounted on the bracket 38. A spring 42 extends between the bell crank arm 39 and a finger 43 on the block 31 and normally holds the side inward with the stirrup 29 in the path of the pins 28. Energisation of the magnet 41 moves the slide and stirrup outward and releases the pins 28.

The electric circuit which actuates the solenoid magnet 41 and another magnet hereafter described is controlled by a so-called "electric eye" or photo-electric cell 45 which is mounted near the upper part of the scale pedestal 7. On the opposite side of the pedestal an electric light 46 is mounted, and it throws a beam of light onto the eye 45 which keeps the eye energized excepting when the beam is interrupted.

The scale beam 8 has an extension 8a which enters the pedestal 7, and on it is mounted a blade 47, the upper end of which swings with movement of the scale beam. This blade 47 is arranged to swing into and interrupt the light beam which energizes the eye 45, but normally when the weighing wheels 21 are unloaded the blade 47 stands at one side of the light beam as shown in Fig. 2.

Referring to Fig. 8, electric current is supplied from a suitable source by the wires 48 to a relay 49 which is conventional, and this relay is controlled by the eye 45 through the wires 50.

The relay 49 is arranged to supply current to the wires 51 when the eye 45 is de-energized by interrupting the light beam but when the beam shines on the eye the relay is controlled to break the circuit to the wires 51. Thus it is only when the eye is de-energized that the wires 51 receive current. The wires 52 extending from the wires 51, lead to the solenoid magnet 41.

When the machine is operating the vibrating trough 15 continuously feeds the loose material into the hopper 4 from where it drops into the two upper and adjoining compartments 26, the partitions 25 forming the bottoms thereof. When the desired weight of material has been deposited in these compartments, the weight 9 on the scale beam 8 becomes overbalanced and the beam tilts, lowering the weighing wheels and their mechanism, and when this occurs the blade 47 swings across the light beam from the light 46 and de-energizes the eye 45. The eye then immediately acts upon the relay to supply current to the wires 51 and 52, which energizes the magnet 41 and pulls down its plunger 40, moving the slide rods 30 and stirrup 29 outwardly and releasing the pins 28 on the weighing wheels 21.

When the pins 28 are released the weight of the material on the partitions 25 immediately turns the wheels and dumps the contents into the hopper 5, relieving the wheels of their weight and permitting them to rise by action of the weight 9. This tilts the scale beam 8 and moves the blade 47 out of the light beam so that the eye again becomes energized and breaks the current to the wires 51 and 52. The magnet 41 is then de-energized and the spring 42 moves the slide 30 with the stirrup 29 again into the path of the pins 28, the next in rotation of which will spring past the latches 32 and enter the stirrup where they are held by the latches.

These movements happen very rapidly, and to insure the quick and positive return of the scale beam 8 to its unweighted position, a pusher 55 is mounted above the weight 9 on a lever 56 which is pivoted on a bracket 57. The opposite end of the lever 56 is connected to the plunger 58 of a solenoid magnet 59. The magnetic coil of the magnet 59 is in circuit with the wires 60 which receive electric current from a suitable source. A self-closing switch 61 is in circuit with the wires 60, and when operated, makes and breaks that circuit. The switch 61 is normally held open so that circuit in the wires 60 is broken.

The switch 61 is operated or held open by the plunger 62 of a delayed-action mechanism comprising a cylinder 63 having a piston 64 and a spring 65 which normally thrusts the piston and plunger in a direction to open the switch 61. The plunger 66 of a solenoid magnet 67 is attached to the piston 64, and the coil 66 of that magnet is in circuit with the wires 51 and when energized the magnet pulls the piston 64 and plunger 62 in a direction to permit closing of the switch 61. When the magnet 66 is de-energized the spring 65 moves the piston in a direction to open the switch 61, but this movement is delayed by air in the cylinder 63 which escapes through a restricted outlet 68 in the cylinder.

It will be seen that by this mechanism de-energizing the eye 45 by movement of the blade 47 closes circuit in the wires 51 which energizes the magnets 41 and 67 simultaneously. The magnet 67 then acts to close the switch 61 which energizes the magnet 59. The magnet 41 acts to release the pins 28 on the wheels 21 and permits them to turn to drop their load, and the magnet 59 actuates the pusher 55 which pushes downward on the weight 9 to return the scale beam 8 to normal unweighted position. When this occurs the magnets 41 and 67 become de-energized and the stirrup 29 immediately returns into the path of the pins 28 to catch and hold the next in rotation of those pins as the wheels 21 turn. These movements happen rapidly and pins 28 are released before the stirrup returns to holding position because of time lag in operation of the magnet 59.

When the pusher 55 lowers onto the weight 9, it pushes the beam 8 and connected parts rapidly, which has a tendency to cause these parts to bounce, and to prevent this the pusher remains down a short time because of delayed action of the piston 64 in the cylinder 63. The time of this delayed action must be short enough so that the pusher 55 moves upward before the wheels 21 again become loaded for the next action and in practice are on the order of one second. To further prevent bouncing and vibration of the parts and to dampen their movements, it is preferred to have the weight 9 made of lead and the pusher 55 is in the nature of a padded cushion covered with leather or similar material.

To recapitulate the operation, the scale beam 8 stands tilted to its unweighted position with the end carrying the weight 9 lowered and the weighing wheels 21 and associated parts elevated. The magnets 41 and 59 are unenergized and the light beam is uninterrupted. The stirrup 29 with the spring latches 32 holds the wheels 21 against rotation.

The material to be weighed is fed constantly by the vibrating trough 15 through the hopper 4 into the adjacent upper compartments 26 of the weighing wheels, and when the desired load has been deposited, its weight will lower the wheels 21 causing the scale beam 8 to tilt and swing the blade 47 across the light beam, thus de-energizing the eye 45. When this occurs the electrical mechanism is put into operation, which simultaneously energizes the magnets 41 and 67. The magnet 41 moves the stirrup 29 to release the pins 28 and wheels 21 and permit the load therein to rotate the wheels, which dump their load into the hopper 5. At the same time the magnet 67 moves the piston 64 and plunger 62 to release and close the switch 61, which energizes the magnet 59, which in turn operates the pusher 55 to return the scale beam 8 to normal position, moving the blade 47 out of the light beam and causing the electric circuits 51 and 52 to become de-energized. This permits the stirrup 29 to be moved back into holding position by the spring 42 so that it will catch and hold the next pins 28 on the wheels 21 as they rotate, and the delayed action of the piston 64 maintains circuit in the wires 60 holding the weight 9 down momentarily and preventing bouncing of the beam. This completes one cycle of the weighing mechanism.

Two complementary weighing wheels 21 have been shown and described, but it is conceived that the device would operate with only one weighing wheel, with proper guides to direct the material into the compartment 26 thereof. Two of such wheels are preferable and give the machine greater capacity within a given size.

The weighed and loose material passes through the hopper 5 into the compressor 70, where it is compressed and pushed in its condensed volume into bags or other packages in which it is handled for transportation, display and sale. The compressor 70 comprises a receiver having an open top, two vertical elongated sides 71, and one closed end 72, preferably semi-circular in shape. The compressor also has a movable pusher 73 which is complementary to the closed end 72. The compressor has a bottom 74, which is closed excepting for a discharge opening 75 near the closed end 72.

The pusher 73 is attached to and moved by the piston rod 76 which is connected to a piston in the cylinder 77. An ejector 78 is mounted for vertical reciprocation at the closed end of the compressor over the opening 75. The ejector 78 is mounted on the piston rod 79 which is connected to and moves with a piston in the vertical cylinder 80. The pistons in the cylinders 77 and 80 are operated in each direction by a suitable fluid medium such as compressed air, which enters and leaves the cylinders by tubes or hose 77$^a$ and 80$^a$.

At the proper time, shortly after the material has been deposited in the compressor, the piston in the horizontal cylinder 77 is actuated to move the pusher 73 toward the closed end 72 which compresses the loose material into a compact body over the discharge opening 75 following which the piston in the vertical cylinder 80 moves downward to eject the compressed material therein downward through the opening 75 and into a bag or package under it, a guide 81 being provided to guide the material into the bag.

In being so compressed the material tends to become so packed that it resists movement out of the compressor. To eliminate this resistance the end 72 and pusher 73 are inclined outwardly and downwardly so that the body of compressed material easily separates from the sides of the compressor in its downward movement and moves freely through the guide 81, which may also have outwardly, downwardly tapered sides.

The invention is defined in the appended claims, which are to be considered comprehensive of all forms coming within their scope.

I claim:

1. A weighing machine comprising, a weighing scale, a supporting bracket hung on said weighing scale, two weighing wheels rotatably mounted on said bracket with their axis in substantially the same horizontal plane and with their peripheries closely adjacent each other, each of said weighing wheels having a plurality of outwardly opening compartments, means for continuously feeding material into upwardly opening adjacent compartments of both of said weighing wheels, said weighing wheels and connected parts lowering by gravity upon accumulation in said compartments thereof of a predetermined weight of material, means for holding said weighing wheels against rotation when in elevated position, means for releasing said weighing wheels for rotation upon said lowering thereof, said holding means becoming reactive to hold said weighing wheels with the next in rotation of the adjacent compartments thereof in upwardly opening, material receiving position.

2. The elements of claim 1 in which said holding means becomes reactive upon elevation of the weighing wheels.

3. The elements of claim 1 in which the compartments of each wheel are separated by radial partitions and two contiguous upwardly opening compartments of the respective wheels coincide to form a single compartment having a bottom formed by adjoining substantially horizontal partitions which swing downwardly by weight of material upon them when the wheels are released and dump the contents of the compartments.

4. The elements of claim 3 in which the outer edges of said partitions are flexible.

5. The elements of claim 1 combined with electrically operated means for quickly returning said weighing wheels to elevated position including a delayed action switch in the electric circuit thereof acting to positively hold the wheels immovable for an appreciable time less than that required to deposit the predetermined weight of material.

References Cited in the file of this patent

UNITED STATES PATENTS

| | | |
|---|---|---|
| 354,423 | Kelley | Dec. 14, 1886 |
| 564,946 | Simons | July 28, 1896 |
| 1,994,756 | De Back | Mar. 19, 1935 |
| 2,013,935 | Weckerly | Sept. 10, 1935 |
| 2,055,730 | Rees | Sept. 29, 1936 |
| 2,058,775 | Cundall | Oct. 27, 1936 |
| 2,150,479 | Anderson | Mar. 14, 1939 |
| 2,380,624 | Young | July 31, 1945 |
| 2,500,819 | Hall | Mar. 14, 1950 |
| 2,597,120 | McCargar | May 20, 1952 |
| 2,618,456 | Parrish | Nov. 18, 1952 |